US012719608B2

(12) United States Patent
Wu et al.

(10) Patent No.: US 12,719,608 B2
(45) Date of Patent: Aug. 25, 2026

(54) PARALLEL QDM ENCODING

(71) Applicant: QUALCOMM Incorporated, San Diego, CA (US)

(72) Inventors: Liangming Wu, Beijing (CN); Ori Shental, Marlboro, NJ (US); Thomas Joseph Richardson, South Orange, NJ (US); Kexin Xiao, Shanghai (CN); Wei Liu, Beijing (CN); Changlong Xu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/563,547

(22) PCT Filed: Jul. 30, 2021

(86) PCT No.: PCT/CN2021/109562

§ 371 (c)(1),
(2) Date: Nov. 22, 2023

(87) PCT Pub. No.: WO2023/004738

PCT Pub. Date: Feb. 2, 2023

(65) Prior Publication Data

US 2024/0223305 A1 Jul. 4, 2024

(51) Int. Cl.
*H04L 1/00* (2006.01)

(52) U.S. Cl.
CPC .......... *H04L 1/0041* (2013.01); *H04L 1/0047* (2013.01)

(58) Field of Classification Search
CPC ............................ H04L 1/0041; H04L 1/0047
(Continued)

(56) References Cited

U.S. PATENT DOCUMENTS 10,069,519 B1 * 9/2018 Millar .................... H04L 1/0042
10,541,711 B1 * 1/2020 Millar ........................ H04B 1/10
(Continued)

FOREIGN PATENT DOCUMENTS

CN 111181652 A 5/2020
WO 2020083491 A1 4/2020
WO 2021083488 A1 5/2021

OTHER PUBLICATIONS

Fehenberger T., et al., "Parallel-Amplitude Architecture and Subset Ranking for Fast Distribution Matching", arXiv:1902.08556v1 [eess. SP], arxiv.Org, Cornell University Library, 201 Olin Library Cornell University Ithaca, NY 14853, Feb. 22, 2019, pp. 1-10, XP081032297, Sections II-V, figures 1-2, table III.
(Continued)

*Primary Examiner* — Anthony Mejia
(74) *Attorney, Agent, or Firm* — Patterson & Sheridan, L.L.P.

(57) ABSTRACT

Certain aspects of the present disclosure provide a technique for parallel distribution matching (DM) encoding. A user equipment (UE) implements the technique to perform a first round of parallel DM encoding using k information bits as input by: 1) segmenting the k information bits into N blocks of information bits, and 2) encoding the N blocks of information bits in parallel with N DM blocks. Each of the N blocks outputs one or more encoded information bits in each of the NDM blocks, and a total number of information bits output by the N DM blocks is less than k. The UE then performs a second round of parallel DM encoding using k' information bits that were not encoded in the first round of DM encoding. The second round of parallel DM encoding includes a same encoding process as implemented in the first round of parallel DC encoding.

30 Claims, 13 Drawing Sheets

(58) Field of Classification Search
USPC .......................................................... 370/310
See application file for complete search history.

(56) References Cited

U.S. PATENT DOCUMENTS

| | | | | |
|---|---|---|---|---|
| 10,608,749 | B1 * | 3/2020 | Morero | H03M 7/14 |
| 10,749,554 | B1 * | 8/2020 | Millar | H04B 1/10 |
| 10,826,619 | B2 * | 11/2020 | Böcherer | H04L 1/0041 |
| 10,972,215 | B2 * | 4/2021 | Cho | H04B 10/808 |
| 12,081,274 | B1 * | 9/2024 | Morero | H04L 27/2275 |
| 2005/0265387 | A1 * | 12/2005 | Khojastepour | H03M 13/1191 370/467 |
| 2019/0109752 | A1 | 4/2019 | Zhang et al. | |
| 2019/0280809 | A1 * | 9/2019 | Cho | H04L 25/03343 |
| 2020/0092009 | A1 * | 3/2020 | Böcherer | H04B 10/25 |
| 2020/0280468 | A1 | 9/2020 | Cho | |
| 2021/0044360 | A1 * | 2/2021 | Morero | H04L 27/3836 |
| 2021/0135778 | A1 | 5/2021 | Yoshida | |
| 2021/0194596 | A1 | 6/2021 | Kim et al. | |
| 2021/0266097 | A1 * | 8/2021 | Huang | H04L 1/005 |
| 2022/0014336 | A1 * | 1/2022 | Zhou | H04L 5/0055 |
| 2023/0123445 | A1 * | 4/2023 | Lee | H04W 40/18 370/310 |
| 2024/0154721 | A1 * | 5/2024 | Wesel | H04L 1/006 |

OTHER PUBLICATIONS

Supplementary European Search Report—EP219513348—Search Authority—Munich—Feb. 24, 2025.

International Search Report and Written Opinion—PCT/CN2021/109562—ISA/EPO—Apr. 25, 2022.

ZTE: "Discussion on DL 1024QAM for NR FR1", 3GPP TSG RAN WG1 #103-e, R1-2007977, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946553, Nov. 13, 2020, 16 Pages, Retrieved on Oct. 24, 2020, Section 3, Part 3, Section 3, pp. 7 and 8, Figure 5.

* cited by examiner

PARALLEL QDM ENCODING

CROSS-REFERENCE TO RELATED APPLICATIONS

This application is a national stage application under 35 U.S.C. 371 of PCT/CN2021/109562, filed Jul. 30, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for performing parallel distribution matching (DM) encoding.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for performing parallel distribution matching (DM) encoding.

Certain aspects of the subject matter described in this disclosure can be implemented in a method for wireless communications by a wireless transmitter. The method generally includes performing a first round of parallel DM encoding using k information bits as input by: 1) segmenting the k information bits into N blocks of information bits, and 2) encoding the N blocks of information bits in parallel with NDM blocks, each of the N blocks carrying one or more encoded information bits in each of the N DM blocks, wherein a total number of information bits carried by the N DM blocks is less than or equal to k; determining k' information bits from the k information bits that were not encoded in the first round of DM encoding; and performing at least a second round of parallel DM encoding using the k' information bits as the input, wherein the second round of parallel DM encoding comprises a same encoding process as implemented in the first round of parallel DC encoding.

Certain aspects of the subject matter described in this disclosure can be implemented in a method for wireless communications by a wireless receiver. The method generally includes receiving parameters used by a wireless transmitter for performing multiple rounds of parallel DM encoding; and decoding a transmission from the wireless transmitter, in accordance with the parameters.

Certain aspects of the subject matter described in this disclosure can be implemented in an apparatus for wireless communications by a wireless transmitter. The apparatus generally includes at least one application processor and a memory configured to: perform a first round of parallel DM encoding using k information bits as input by: 1) segmenting the k information bits into N blocks of information bits, and 2) encoding the N blocks of information bits in parallel with N DM blocks, each of the N blocks carrying one or more encoded information bits in each of the N DM blocks, wherein a total number of information bits carried by the N DM blocks is less than or equal to k; determine k' information bits from the k information bits that were not encoded in the first round of DM encoding; and perform at least a second round of parallel DM encoding using the k' information bits as the input, wherein the second round of parallel DM encoding comprises a same encoding process as implemented in the first round of parallel DC encoding.

Certain aspects of the subject matter described in this disclosure can be implemented in an apparatus for wireless communications by a wireless receiver. The apparatus generally includes at least one application processor and a memory configured to: receive parameters used by a wireless transmitter for performing multiple rounds of parallel DM encoding; and decode a transmission from the wireless transmitter, in accordance with the parameters.

Certain aspects of the subject matter described in this disclosure can be implemented in an apparatus for wireless communications by a wireless transmitter. The apparatus generally includes means for performing a first round of parallel DM encoding using k information bits as input by: 1) segmenting the k information bits into N blocks of information bits, and 2) encoding the N blocks of information bits in parallel with N DM blocks, each of the N blocks carrying one or more encoded information bits in each of the N DM blocks, wherein a total number of information bits carried by the N DM blocks is less than or equal to k; means for determining k' information bits from the k information bits that were not encoded in the first round of DM encoding; and means for performing at least a second round of parallel DM encoding using the k' information bits as the input, wherein the second round of parallel DM encoding comprises a same encoding process as implemented in the first round of parallel DC encoding.

Certain aspects of the subject matter described in this disclosure can be implemented in an apparatus for wireless communications by a wireless receiver. The apparatus generally includes means for receiving parameters used by a wireless transmitter for performing multiple rounds of parallel DM encoding; and means for decoding a transmission from the wireless transmitter, in accordance with the parameters.

Certain aspects of the subject matter described in this disclosure can be implemented in a computer readable medium storing computer executable code thereon for wireless communications by a wireless transmitter. The computer readable medium generally includes code for performing a first round of parallel DM encoding using k information bits as input by: 1) segmenting the k information bits into N blocks of information bits, and 2) encoding the N blocks of information bits in parallel with NDM blocks, each of the N blocks carrying one or more encoded information bits in each of the N DM blocks, wherein a total number of information bits carried by the N DM blocks is less than or equal to k; code for determining k' information bits from the k information bits that were not encoded in the first round of DM encoding; and code for performing at least a second round of parallel DM encoding using the k' information bits as the input, wherein the second round of parallel DM encoding comprises a same encoding process as implemented in the first round of parallel DC encoding.

Certain aspects of the subject matter described in this disclosure can be implemented in a computer readable medium storing computer executable code thereon for wireless communications by a wireless receiver. The computer readable medium generally includes code for receiving parameters used by a wireless transmitter for performing multiple rounds of parallel DM encoding; and code for decoding a transmission from the wireless transmitter, in accordance with the parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
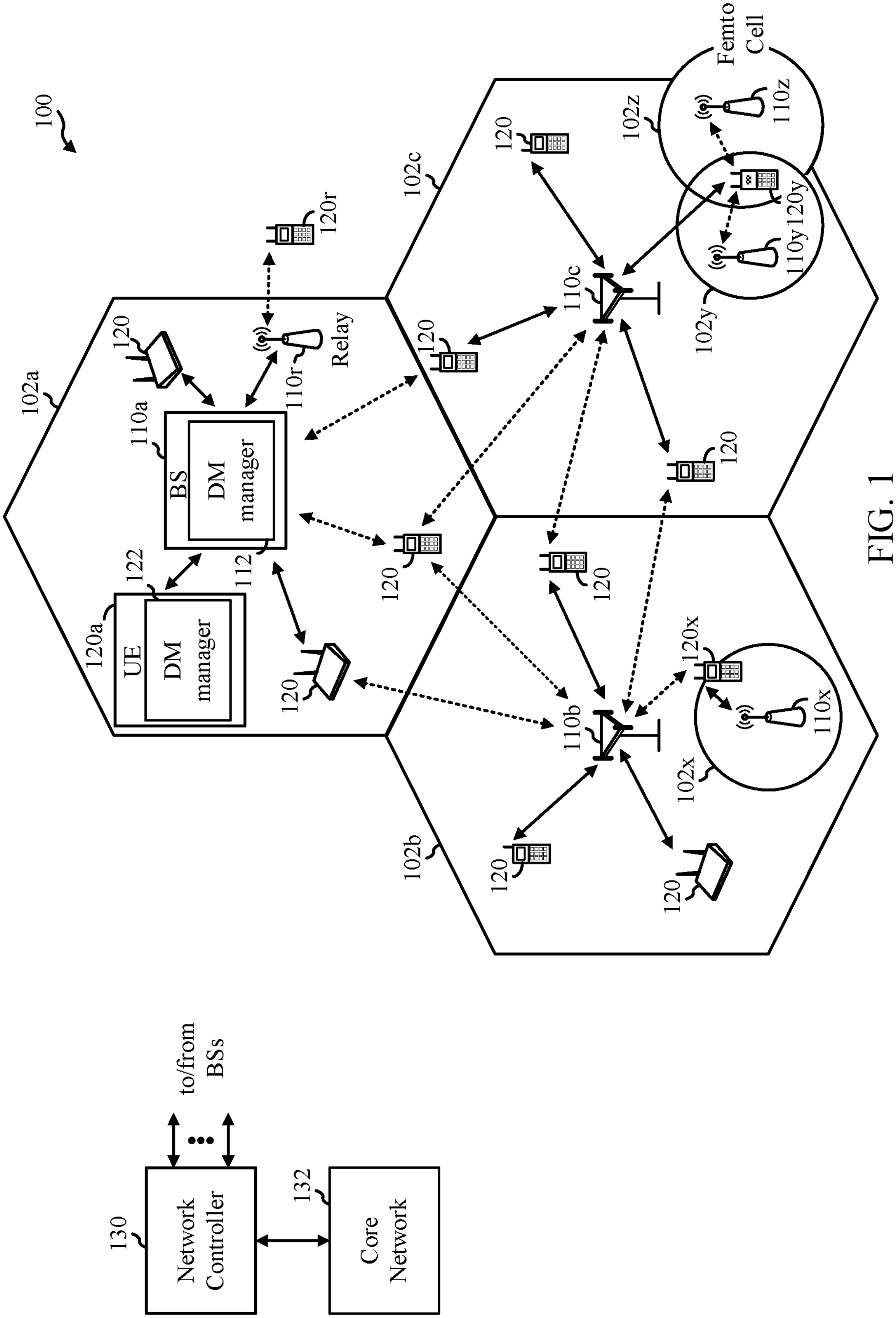
FIG. 1 is a block diagram conceptually illustrating an example wireless communication network, in accordance with certain aspects of the present disclosure.

Aspects of the present disclosure provide apparatus, methods, processing systems, and computer readable mediums for performing parallel distribution matching (DM) encoding.

For example, a wireless transmitter may perform one or more rounds of segmentation and encoding using k information bits as an input until all of the k information bits are encoded. In a first round of the segmentation and encoding, the k information bits are segmented into N parallel DM blocks. The wireless transmitter runs the N DM blocks in parallel to generate an encoded output for each of the N DM blocks. The wireless transmitter determines k' information bits from the k information bits that were not encoded in the first round based on the encoded output for each of the N DM blocks. The wireless transmitter uses the k' information bits as the input for a second round of the segmentation and encoding (performed in a similar way as the first round of the segmentation and encoding). The wireless transmitter performs additional rounds of the segmentation and encoding until all of the k information bits are encoded.

The following description provides examples of parallel DM encoding in wireless communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3$^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 for performing parallel distribution matching (DM) encoding. As shown in FIG. 1, a UE 120*a* includes a DM manager 122 and a BS 110*a* includes a DM manager 112. The DM manager 122 may be configured to perform operations 900 of FIG. 9 and/or operations 1000 of FIG. 10. The DM manager 112 may be configured to perform operations 900 of FIG. 9 and/or operations 1000 of FIG. 10.

The wireless communication network 100 may be a new radio (NR) system (e.g., a 5$^{th}$ generation (5G) NR network). As shown in FIG. 1, the wireless communication network 100 may be in communication with a core network. The core network may in communication with BSs 110*a-z* (each also individually referred to herein as a BS 110 or collectively as BSs 110) and/or UEs 120*a-y* (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
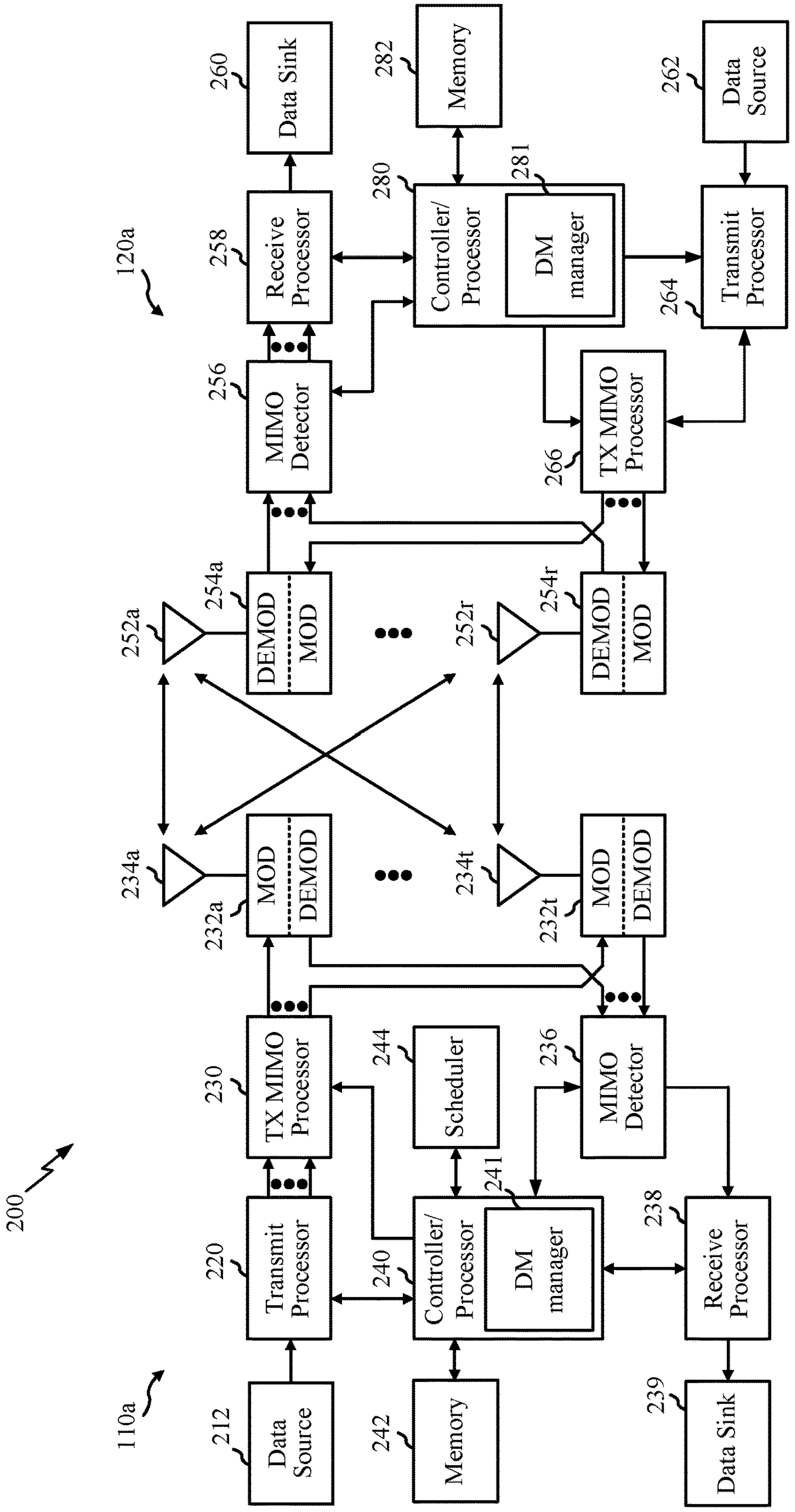
FIG. 2 is a block diagram conceptually illustrating a design of an example base station (BS) and user equipment (UE), in accordance with certain aspects of the present disclosure.

FIG. 2 illustrates example components of a BS 110*a* and a UE 120*a* (e.g., in the wireless communication network 100 of FIG. 1).

At the BS 110*a*, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232*a*-232*t*. Each MOD in transceivers 232*a*-232*t* may process a respective output symbol stream (e.g., for orthogonal frequency division multiplexing (OFDM), etc.) to obtain an output sample stream. Each MOD in transceivers 232*a*-232*t* may further process (e.g., convert to analog, amplify, filter, and upconvert) the output sample stream to obtain a downlink (DL) signal. The DL signals from the MODs in transceivers 232*a*-232*t* may be transmitted via antennas 234*a*-234*t*, respectively.

At the UE 120*a*, antennas 252*a*-252*r* may receive DL signals from the BS 110*a* and may provide received signals to demodulators (DEMODs) in transceivers 254*a*-254*r*, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On an uplink (UL), at the UE 120*a*, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254*a*-254*r* (e.g., for SC-FDM, etc.), and transmitted to the BS 110*a*. At the BS 110*a*, the UL signals from the UE 120*a* may be received by the antennas 234, processed by the DEMODs in transceivers 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

Memories 242 and 282 may store data and program codes for the BS 110*a* and the UE 120*a*, respectively. A scheduler 244 may schedule the UE 120*a* for data transmission on a DL and/or an UL.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a DM manager 241 that may be configured to perform the operations illustrated in FIG. 9 and/or FIG. 10, as well as other operations disclosed herein. As shown in FIG. 2, the controller/processor 280 of the UE 120*a* has a DM manager 281 that may be configured to perform the operations illustrated in FIG. 9 and/or FIG. 10, as well as other operations disclosed herein. Although shown at the controller/processor, other components of the UE 120*a* and the BS 110*a* may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
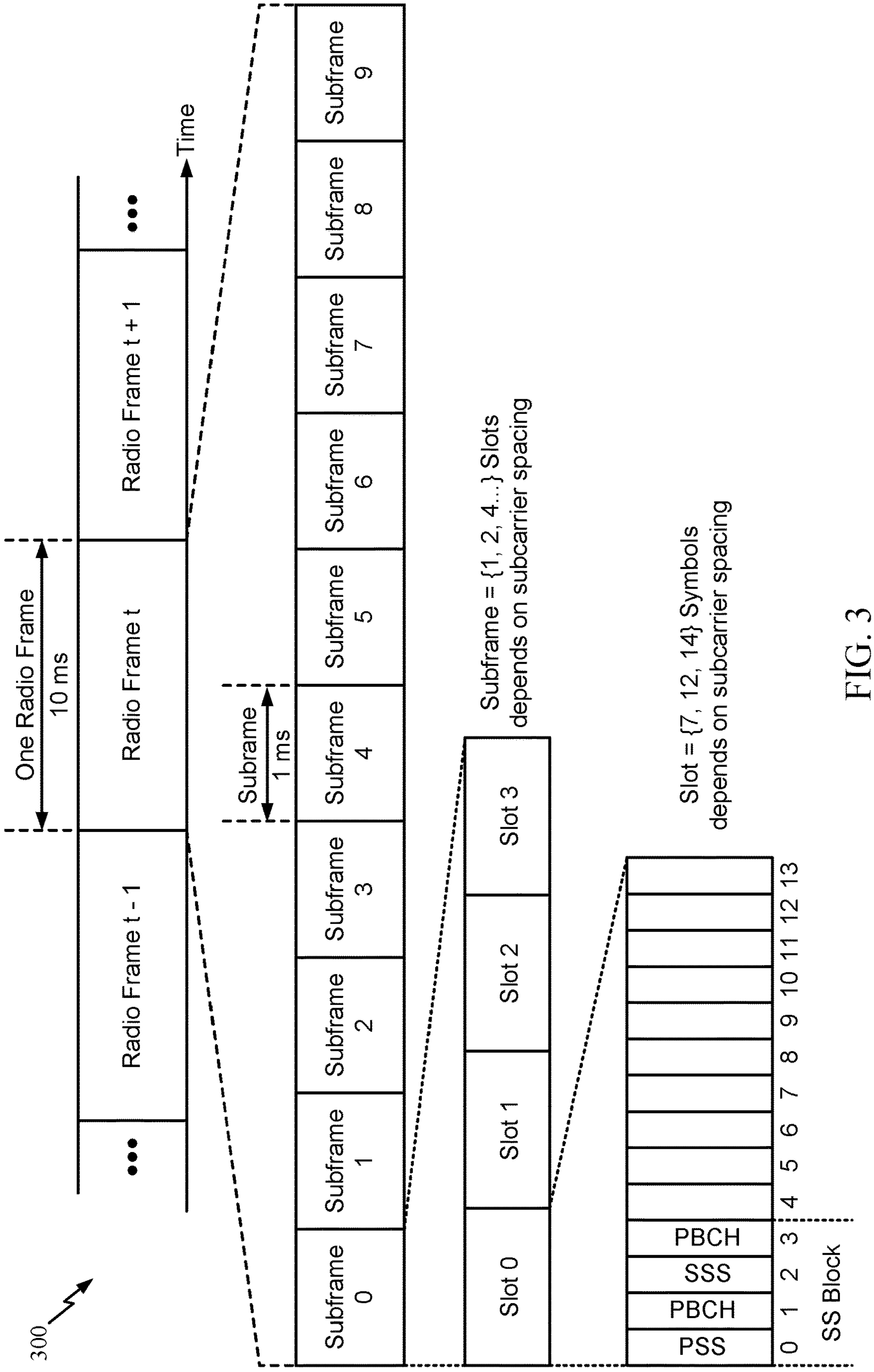
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Distribution Matching (DM)

A distribution matcher is configured to perform distribution matching (DM), which is based on a lossless probabilistic compression and decompression (e.g., entropy encoding). A direct DM may include a constant composition DM (CCDM) and a multiset-partition DM (MPDM). The CCDM and/or the MPDM may achieve a target probability mass function (PMF). The DM is a simple and a cost-effective process.

Figure 4:
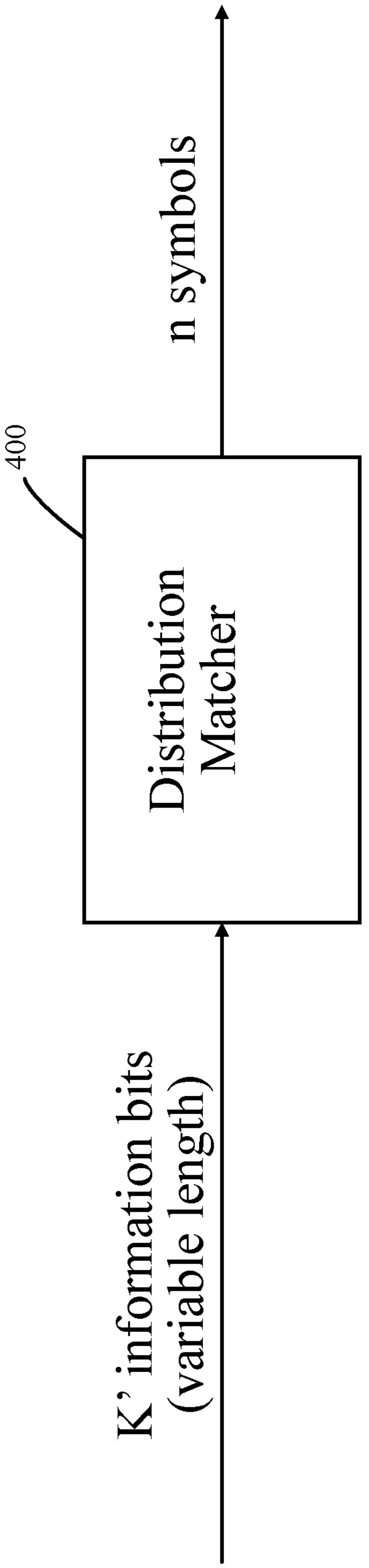
FIG. 4 illustrates a block diagram of an example distribution matcher, in accordance with certain aspects of the present disclosure.

As illustrated in FIG. 4, a distribution matcher 400 is employed for DM. The distribution matcher 400 is configured to match a vector of bits (e.g., uniformly distributed k' information bits) to a vector of symbols (e.g., non-uniformly distributed n symbols).

In some cases, the distribution matcher 400 may include a decompressor, a compressor, and a comparator. In some cases, the decompressor receives and converts a sequence of information bits into a set of symbols. The sequence of information bits may be uniformly distributed. The decompressor transmits the sequence of symbols to the compressor. In some cases, the compressor receives the set of symbols from the decompressor, and converts the set of symbols into a sequence of compressed information bits. In some cases, the comparator compares the sequence of information bits to the sequence of compressed information bits to determine how many information bits were not converted into the set of symbols.

In some cases, the distribution matcher 400 may provide the output of the comparator to a wireless receiver. The wireless receiver uses the output of the comparator to determine how to process the set of symbols. For example, based on a compressor at the wireless receiver, the wireless receiver may compress the set of symbols to generate information bits based on a target PMF, which may result in extra bits. The wireless receiver may use the output of the comparator (e.g., discard signaling) to determine how many bits to discard.

Figure 5:
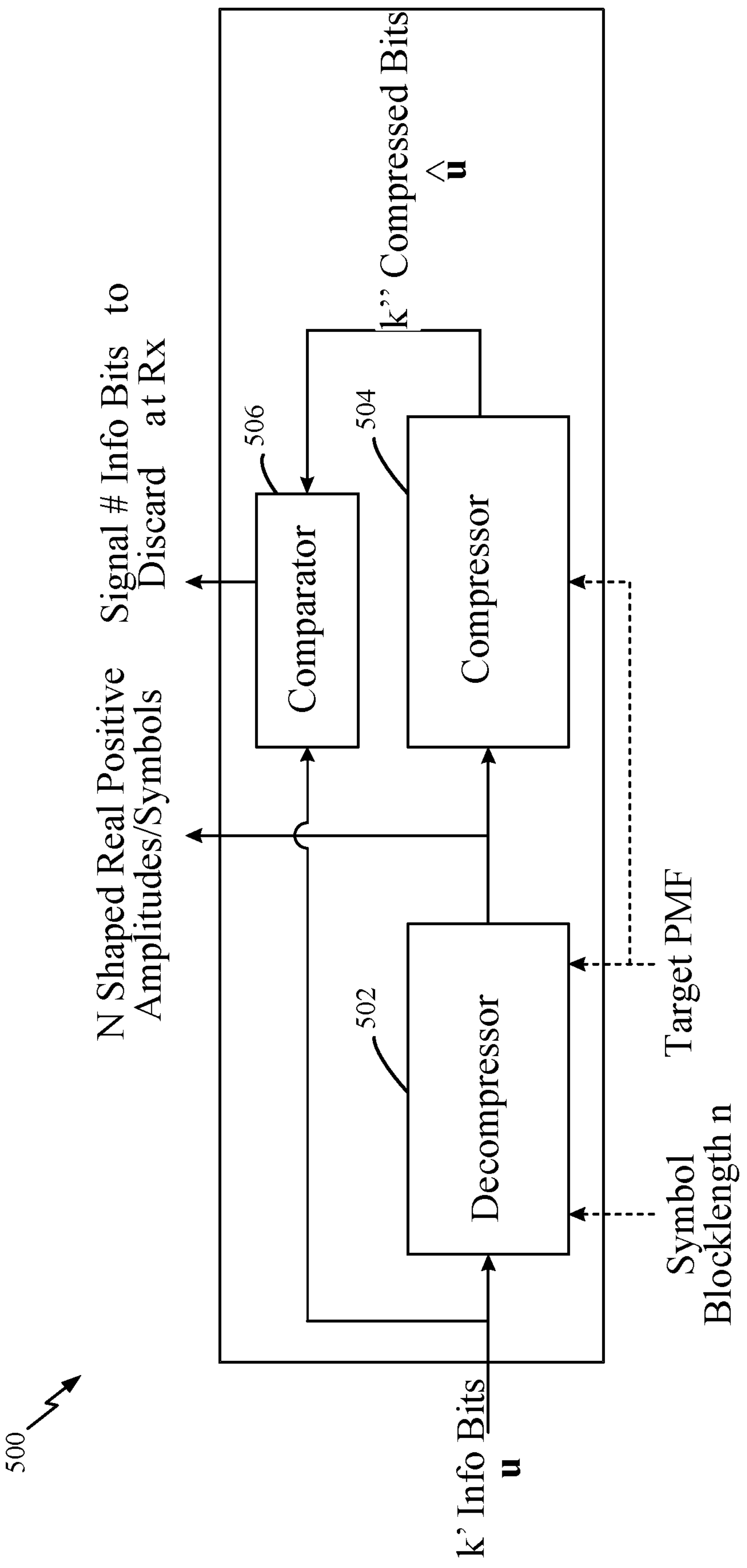
FIG. 5 illustrates a block diagram of an example wireless transmitter fixed-to-fixed distribution matcher, in accordance with certain aspects of the present disclosure.

As illustrated in FIG. 5, a distribution matcher 500 (e.g., a wireless transmitter distribution matcher) employs reversed back-to-back compression and decompression. For example, the distribution matcher 500 includes a decompressor 502, a compressor 504, and a comparator 506.

In some cases, the decompressor 502 receives a sequence (u) of k' information bits (e.g., from an information source that produces the k' information bits) and generates a set of symbols (n). In some cases, the decompressor 502 also receives a target PMF (e.g., such as the Maxwell-Boltzmann Distribution) and a symbol block length (n). In such cases, the decompressor 502 generates the set of symbols (n) based on the sequence (u) of k' information bits, the target PMF, and the symbol block length (n). The set of symbols (n) represent shaped real positive amplitude symbols. The set of symbols (n) are transmitted to a wireless receiver over a channel.

In some cases, the compressor 504 receives the set of symbols (n) from the decompressor 502. The compressor 504 also receives the target PMF. The compressor 504 applies the target PMF to generate a sequence (û) of k" compressed information bits based on the received set of symbols (n).

In some cases, the comparator 506 receives the sequence (u) of k' information bits (e.g., from the information source) and the sequence (û) of k" compressed information bits (e.g., from the compressor 504) as an input. The comparator 506 compares the sequence (u) of k' information bits and the sequence (û) of k" compressed information bits to generate a discard signal.

In some cases, the discard signal provides information about postfix bits (e.g., last bits or last segment of bits in the sequence), and is based on a difference in a quantity of bits of the sequence (û) of k" compressed information bits and the sequence (u) of k' information bits. For example, the decompressor 502 may receive a sequence (u) of 50 information bits. Based on the symbol block length (n) and the target PMF, the decompressor 502 may generate the set of symbols (n) using 40 bits. The compressor 504 may receive the set of symbols (n) from the decompressor 502, and generate the sequence (û) of 40 compressed information bits. The comparator 506 may compare the sequence (u) of 50 information bits and the sequence (û) of 40 compressed information bits. The comparator 506 may determine that 10 bits were not used based on the comparison of the sequence (u) of 50 information bits and the sequence (û) of 40 compressed information bits. The comparator 506 may then generate the discard signal, which may indicate that 10 bits were not used.

In some cases, the distribution matcher 500 determines whether an n-length sequence of symbols distributed according to the target PMF can be compressed to the given information bit sequence (u) of at least length k'.

When the distribution matcher 500 determines that the n-length sequence of symbols distributed according to the target PMF can be compressed to the given information bit sequence (u) of at least length k', then a quantity of a first k' information bits of the sequence (u) is less than or equal to a quantity of a first k" compressed information bits of the sequence (û) and are identical (i.e., the first k'≤k" bits of u and û are identical). Additionally, the first k" compressed information bits of the sequence (û) may be part of a prefix code. Accordingly, the discard signal may indicate to discard zero bits.

However, when the distribution matcher 500 determines that the n-length sequence of symbols distributed according to the target PMF cannot be compressed to the given information bit sequence (u) of at least length k', then the discard signal indicates to discard one or more bits. For example, only a portion of the first k' information bits of the sequence (u) and the k" compressed information bits of the sequence (û) may be the same (i.e., u≠û). Also, for example, a quantity of the portion of bits that are the same may be determined by the following equation (Equation 1):

$$\text{Identical bits} = (\min(k', k'') - \text{discard}.$$

In Equation 1, the variable k' represents the quantity of information bits of the sequence (u), the variable k" represents the quantity of compressed information bits of the sequence (û), and the variable "discard" represents the difference in the respective quantities of the information bits of the sequence (u) and the compressed information bits of the sequence (û). Accordingly, based on Equation 1, the identical bits may be determined based on a difference between the minimum of the quantity of information bits of the sequence (u) and the quantity of compressed information bits of the sequence (û), and the difference in the respective quantities. Additionally, the sequence (u) and the sequence (û) are not the same starting at the bit (min(k',k")-discard+t).

In some cases, transmitting the set of symbols (n) may include an overhead. For example, if the n-length sequence of symbols distributed according to the target PMF cannot be compressed to the given information bit sequence (u) of at least length k', then the set of symbols (n) may include additional bits that the wireless receiver discards (i.e., discard postfix bits). Additionally, the wireless transmitter transmits the discard signal to the wireless receiver (e.g., via an unshaped amplitude signs). In some cases, the discard signal may be of length "dec2bin (discard)" bits, which converts the decimal value of the sequence of bits to discard into a binary value. Accordingly, the total value of bits that may be conveyed by the wireless transmitter to the wireless receiver may be determined by the following equation (Equation 2):

$$k = k' - \text{discard} - \text{length}(dec2bin(\text{discard}))$$

In Equation 2, the variable k represents the total value of bits conveyed by the wireless transmitter, the variable k' represents the quantity of information bits of the sequence (u), the variable "discard" represents the difference in the respective quantities of the information bits of the sequence (u) and the compressed information bits of the sequence (û), and the variable "length(dec2bin(discard))" represents the decimal-to-binary value of the discarded bits.

Figure 6:
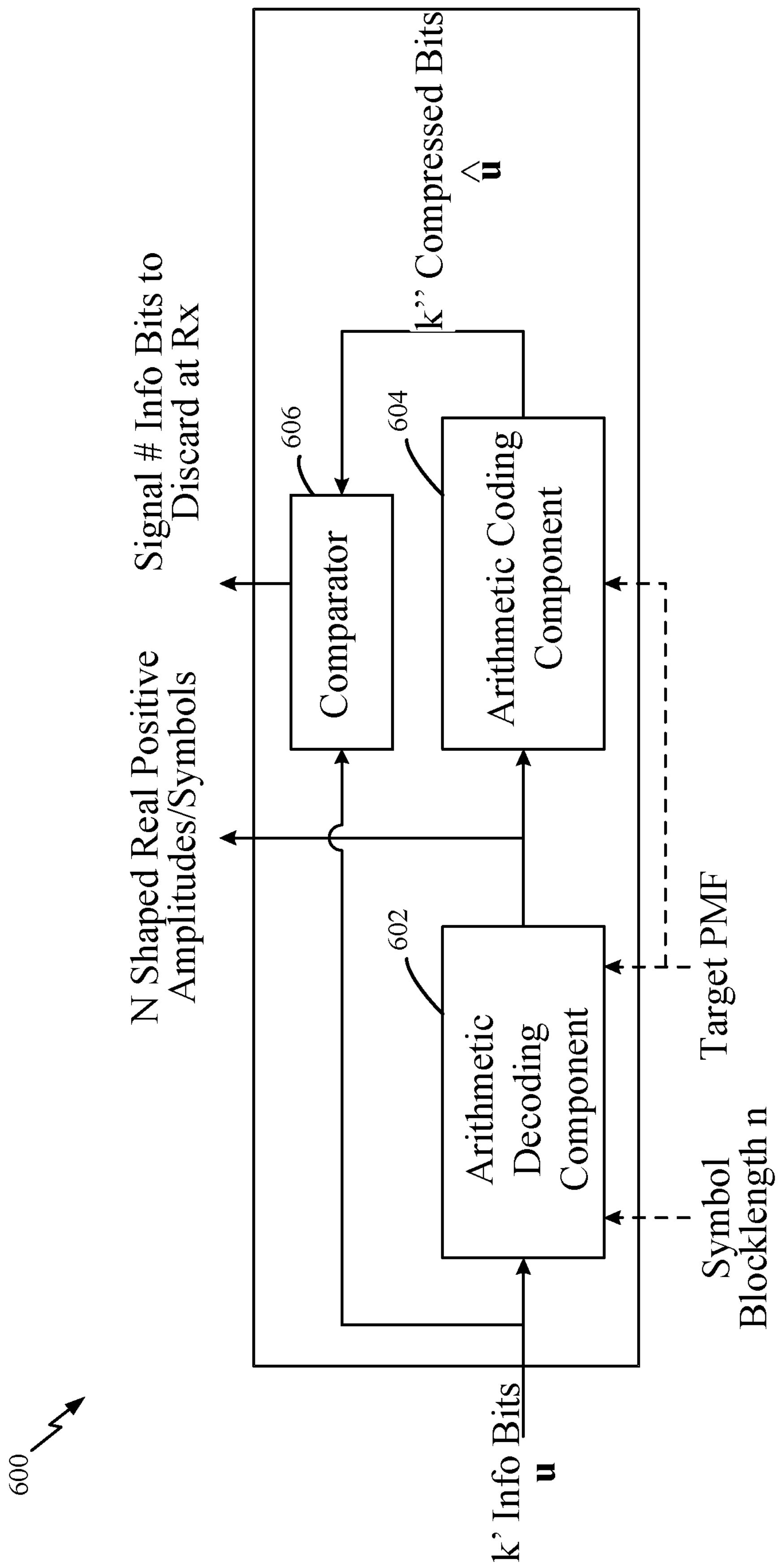
FIG. 6 illustrates a block diagram of an example wireless transmitter fixed-to-fixed arithmetic distribution matcher configured for a single round of compression and decompression, in accordance with certain aspects of the present disclosure.

As illustrated in FIG. 6, a distribution matcher 600 (e.g., a wireless transmitter arithmetic distribution matcher) employs reversed back-to-back compression and decompression. For example, the distribution matcher 600 includes an arithmetic decoding component 602 (e.g., implemented as the decompressor 502 of FIG. 5), an arithmetic coding component 604 (e.g., implemented as the compressor 504 of FIG. 5), and a comparator 606 (e.g., implemented as the comparator 506 of FIG. 5).

In some cases, the arithmetic decoding component 602 receives a sequence (u) of k' information bits (e.g., from an information source that produces the k' information bits) and generates a set of symbols (n). In some cases, the arithmetic decoding component 602 also receives a target PMF (e.g., such as the Maxwell-Boltzmann Distribution) and a symbol block length (n). In such cases, the arithmetic decoding component 602 generates the set of symbols (n) based on the sequence (u) of k' information bits, the target PMF, and the symbol block length (n). The set of symbols (n) represent shaped real positive amplitude symbols. The set of symbols (n) are transmitted to a wireless receiver over a channel.

In some cases, the arithmetic coding component 604 receives the set of symbols (n) from the arithmetic decoding component 602. The arithmetic coding component 604 also receives the target PMF. The arithmetic coding component 604 applies the target PMF to generate a sequence (û) of k" compressed information bits based on the received set of symbols (n).

In some cases, the comparator 606 receives the sequence (u) of k' information bits (e.g., from the information source) and the sequence (û) of k" compressed information bits (e.g., from the compressor 504) as an input. The comparator 606 compares the sequence (u) of k' information bits and the sequence (û) of k" compressed information bits to generate a discard signal (e.g., implemented as the discard signal of FIG. 5). The discard signal provides information about postfix bits (e.g., last bits or last segment of bits in the sequence), and is based on a difference in a quantity of bits of the sequence (û) of k" compressed information bits and the sequence (u) of k' information bits.

In some cases, the arithmetic decoding component 602 and the arithmetic coding component 604 may perform entropy decoding and encoding. The application of the entropy decoding and encoding may improve compression ratios. The improvement in the compression ratios may allow more information bits to be converted into symbols. This may further allow an n-length sequence of symbols distributed according to a target PMF to be compressed to a given information bit sequence (u) of at least length k'. However, it may be appreciated that other examples may employ other techniques for coding. For example, the distribution matcher 600 may employ Huffman coding, range coding, or universal coding.

Figure 7:
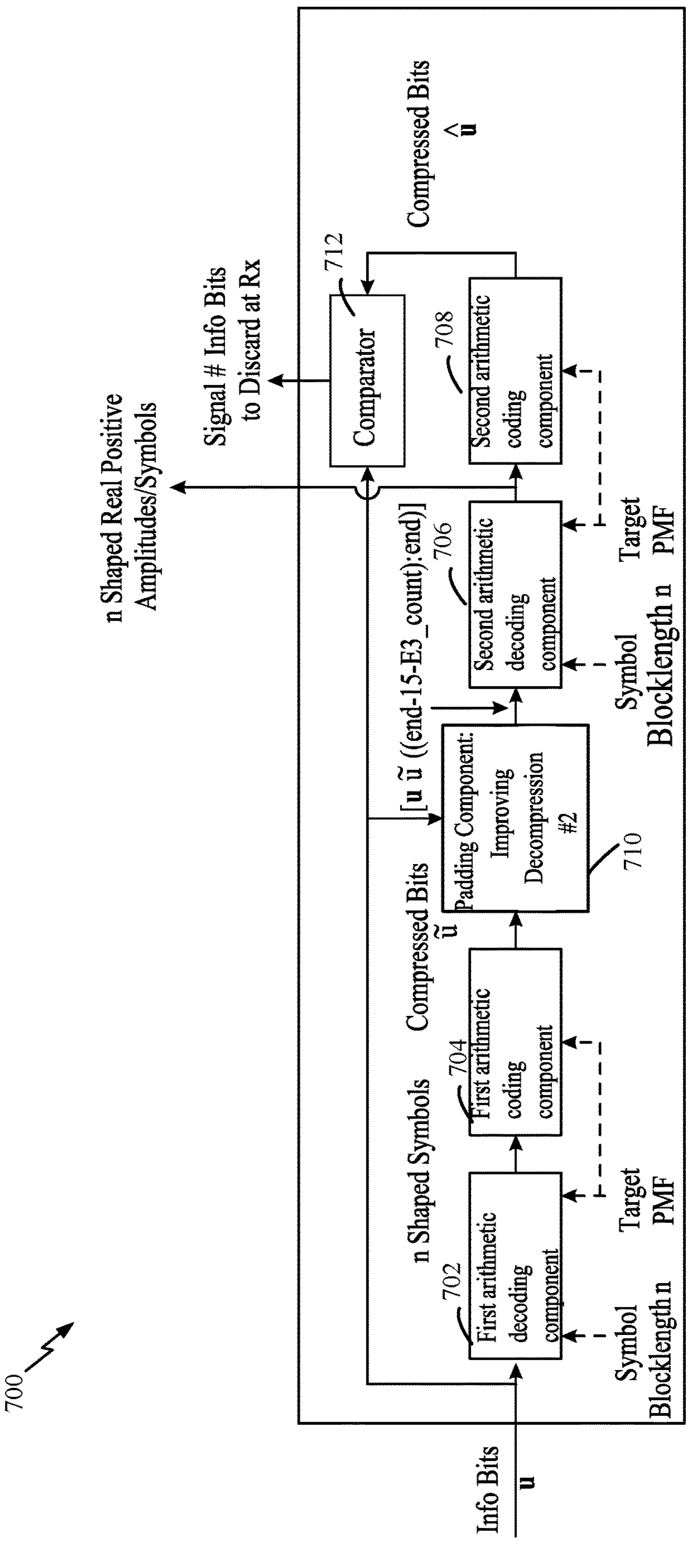
FIG. 7 illustrates a block diagram of an example wireless transmitter arithmetic distribution matcher configured for two rounds of compression and decompression, in accordance with certain aspects of the present disclosure.

As illustrated in FIG. 7, a distribution matcher 700 (e.g., a wireless transmitter arithmetic distribution matcher) implements two rounds of decompression and compression. For example, the distribution matcher 700 includes a first arithmetic decoding component 702 (e.g., implemented as the decompressor 502 of FIG. 5), a first arithmetic coding component 704 (e.g., implemented as the compressor 504 of FIG. 5), a second arithmetic decoding component 706 (e.g., implemented as the decompressor 502 of FIG. 5), a second arithmetic coding component 708 (e.g., implemented as the compressor 504 of FIG. 5), a padding component 710, and a comparator 712 (e.g., implemented as the comparator 506 of FIG. 5).

In some cases, the first arithmetic decoding component 702 receives a sequence (u) of k' information bits (e.g., from an information source that produces the k' information bits) and generates a set of symbols (n) (i.e., n shaped symbols). In some cases, the first arithmetic decoding component 702 also receives a target PMF (e.g., such as the Maxwell-Boltzmann Distribution) and a symbol block length (n). In such cases, the first arithmetic decoding component 702 generates the set of symbols (n) based on the sequence (u) of k' information bits, the target PMF, and the symbol block length (n). The set of symbols (n) represent shaped real positive amplitude symbols. The set of symbols (n) are transmitted to a wireless receiver over a channel.

In some cases, the first arithmetic coding component 704 receives the set of symbols (n) from the first arithmetic decoding component 702. The first arithmetic coding component 704 also receives the target PMF. The first arithmetic coding component 704 applies the target PMF to generate a sequence (û) of k" compressed information bits based on the received set of symbols (n).

In some cases, the padding component 710 receives the sequence (u) of k' information bits (e.g., from the information source). The padding component 710 further receives the sequence (û) of k" compressed information bits from the first arithmetic coding component 704. In some cases, the padding component 710 assists in increasing a number of de-compressible information bits sequences (i.e., discarding bits being equal to 0 is more frequent).

In some cases, the second arithmetic decoding component 706 receives an input (e.g., u u((end-15-E3_count):end)) from the padding component 710. E3 is a number of times the E3 condition is hit. The second arithmetic decoding component 706 also receives a target PMF and a symbol block length (n). The second arithmetic decoding component 706 generates a set of symbols (n) based on the input from the padding component 710, the target PMF, and the symbol block length (n). The set of symbols (n) represent shaped real positive amplitude symbols.

In some cases, the second arithmetic coding component 708 receives the set of symbols (n) from the second arithmetic decoding component 706. The second arithmetic coding component 708 also receives the target PMF. The second arithmetic coding component 708 applies the target PMF to generate a sequence (u) of k" compressed information bits based on the received set of symbols (n).

In some cases, the comparator 712 receives the sequence (u) of k' information bits (e.g., from the information source) and the sequence (û) of k" compressed information bits (e.g., from the second arithmetic coding component 708) as an input. The comparator 712 compares the sequence (u) of k' information bits and the sequence (û) of k" compressed information bits to generate a discard signal (e.g., implemented as the discard signal of FIG. 5). The discard signal provides information about postfix bits (e.g., last bits or last segment of bits in the sequence), and is based on a difference in a quantity of bits of the sequence (û) of k" compressed information bits and the sequence (u) of k' information bits.

The distribution matcher such as the distribution matcher 700 has several advantages. For example, the distribution matcher 700 conveys more number of information bits than the distribution matcher 600 (that implements a single round of decompression and compression). Also, the distribution matcher 700 is spectrally more efficient than the distribution matcher 600 for relatively short block lengths.

Figure 8:
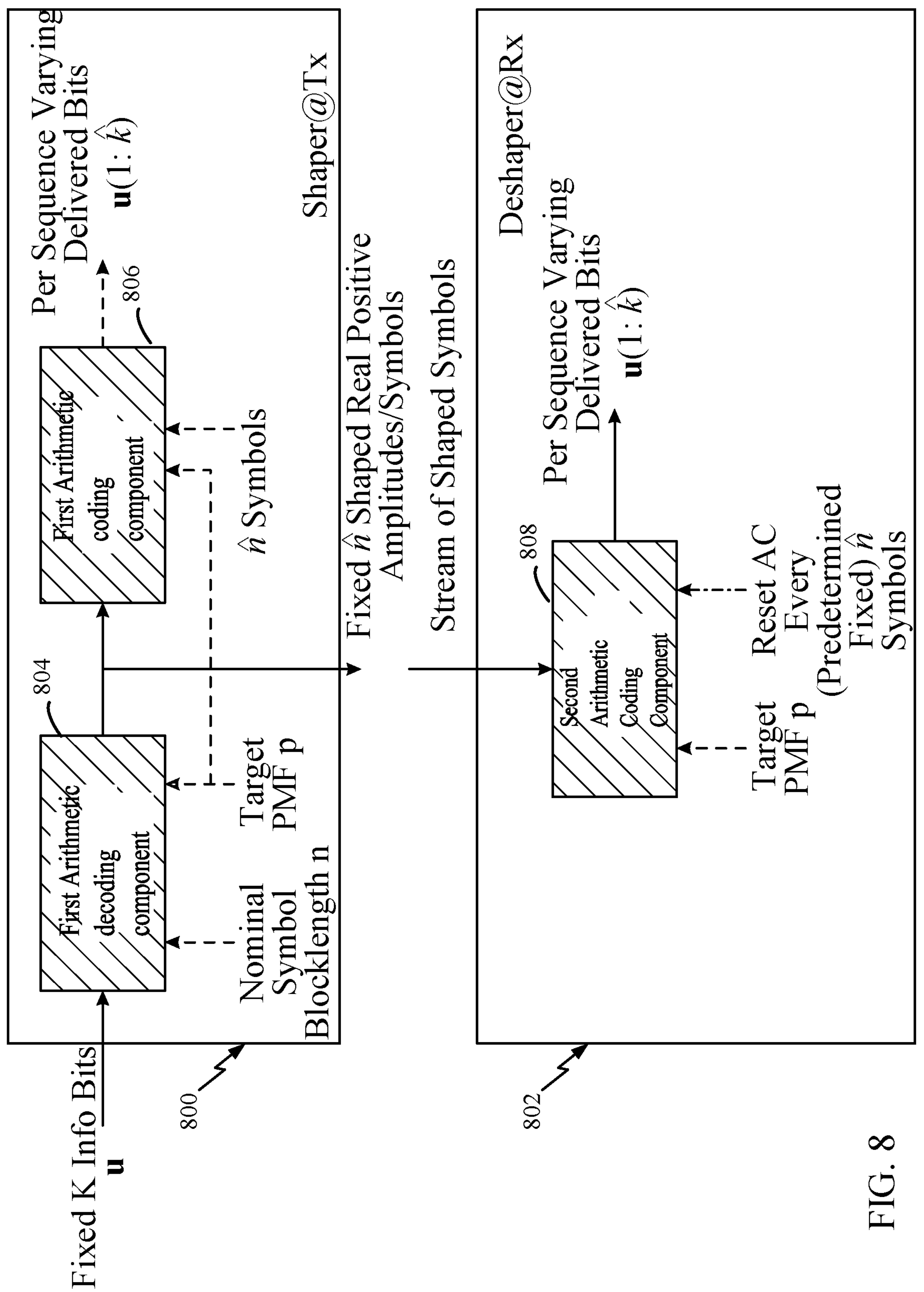
FIG. 8 illustrates a block diagram of an example wireless transmitter variable-to-fixed distribution matcher and wireless receiver variable-to-fixed distribution matcher, in accordance with certain aspects of the present disclosure.

As illustrated in FIG. 8, a wireless transmitter variable-to-fixed distribution matcher 800 and a wireless receiver variable-to-fixed distribution matcher 802 are implemented using arithmetic coding techniques and components. The wireless transmitter variable-to-fixed distribution matcher 800 and the wireless receiver variable-to-fixed distribution matcher 802 may perform entropy decoding and/or encoding.

In some cases, the wireless transmitter variable-to-fixed distribution matcher 800 includes a first arithmetic decoding component 804 (e.g., implemented as a decompressor) and a first arithmetic coding component 806 (e.g., implemented as a compressor). In some cases, the wireless receiver variable-to-fixed distribution matcher 802 includes a second arithmetic coding component 808 (e.g., implemented as the compressor).

In some cases, the first arithmetic decoding component 804 receives a sequence (u) of k information bits (e.g., from an information source that produces the k information bits) and generates a set of symbols (n̂). In some cases, the first arithmetic decoding component 804 also receives a target PMF (e.g., such as the Maxwell-Boltzmann Distribution) and a symbol block length (n). In such cases, the first arithmetic decoding component 804 generates the set of symbols (n̂) based on the sequence (u) of k information bits, the target PMF, and the symbol block length (n). The set of symbols (n̂) represent shaped real positive amplitude symbols. The set of symbols (n̂) are transmitted to the wireless receiver variable-to-fixed distribution matcher 802 over a channel.

In some cases, the first arithmetic decoding component 804 stops (i.e., back off/eject) arithmetic decoding after decoding/decompressing the set of symbols (n̂) (i.e., after the set of symbols (n̂) are generated). The first arithmetic decoding component 804 determines a quantity of the set of symbols (n̂) by the following equation (Equation 3):

$$(\hat{n}) = \lfloor k/L \rfloor$$

In Equation 3, the variable (n̂) represents a quantity of symbols at which the first arithmetic decoding component 804 has to stop the arithmetic decoding, the variable k represents the quantity of information bits of the sequence (u), and the variable L corresponds to an entropy under the target PMF.

In some examples, a value of L is determined by the following equation (Equation 4):

$$L = H_p + 2$$

In some examples, the value of L is determined by the following equation (Equation 5):

$$L = \lceil H_p \rceil + 1$$

In Equation 4 and Equation 5, the variable $H_p$ represents the entropy of the target PMF.

In some cases, the quantity of symbols of the set of symbols (n) is less than the quantity of symbols of the set of symbols (n) of FIG. 6. Additionally, a quantity of conveyed bits $\hat{k}$ is less than the k information bits. Accordingly, additional bits (such as the bits to discard) are not transmitted to the wireless receiver.

In one non-limiting example, the first arithmetic decoding component 804 may receive a sequence (u) of 50 information bits and a value of L may be 2. The first arithmetic decoding component 804 may then stop the arithmetic decoding at (n̂) symbols (e.g., 50 bits/2=25 symbols). The wireless transmitter may then transmit 25 symbols.

In some cases, the first arithmetic decoding component 804 does not process the full sequence (u) of k information bits, and stops the processing after $\hat{k}$ bits where $\hat{k}$ is less than the k information bits (i.e., effectively $\hat{k}<k$ bits are transmitted over $\hat{n}=\lfloor k/L \rfloor<n$ symbols). In the above non-limiting example, the first arithmetic decoding component 804 may use 40 bits of the sequence (u) of 50 information bits to generate the 25 symbols.

In some cases, the first arithmetic coding component 806 receives the set of symbols ($\hat{n}$) from the first arithmetic decoding component 804. The first arithmetic coding component 806 also receives the target PMF. The first arithmetic coding component 806 applies the target PMF to generate a sequence ($\hat{u}$) of $\hat{k}$ conveyed bits based on the received set of symbols ($\hat{n}$).

In some cases, the first arithmetic coding component 806 may enable the wireless transmitter variable-to-fixed distribution matcher 800 to determine which bits of the sequence (u) of k information bits were converted to symbols. In the above non-limiting example, the first arithmetic coding component 806 may determine that the 25 symbols conveyed to the wireless receiver correspond to bits 1 to 40 of the sequence (u) of 50 information bits. In some cases, the first arithmetic decoding component 804 may then use the information regarding the sequence ($\hat{u}$) of $\hat{k}$ conveyed bits to determine which bit to start the next decoding procedure. In the above non-limiting example, the first arithmetic decoding component 804 may start the next decoding procedure on bits 41 to 50 of the sequence (u) of 50 information bits. In some cases, the set of symbols ($\hat{n}$) generated by the next decoding procedure may be different than the previous set of symbols ($\hat{n}$). In the above non-limiting example, the quantity of information bits to process for the next decoding procedure is 10 information bits from the sequence (u) of 50 information bits and with the same value of L (i.e., 2), the next decoding procedure may generate five symbols (e.g., 10 bits/2=5 symbols).

In some cases, the second arithmetic coding component 808 receives the set of symbols ($\hat{n}$) from the first arithmetic decoding component 804. The second arithmetic coding component 808 generates the sequence ($\hat{u}$) of $\hat{k}$ conveyed bits based on the set of symbols ($\hat{n}$) and the target PMF (p). In some cases, the second arithmetic coding component 808 may be similar to the first arithmetic coding component 806. For example, the sequence ($\hat{u}$) of $\hat{k}$ conveyed bits generated by the first arithmetic coding component 806 and the second arithmetic coding component 808 may be the same.

In some cases, the set of symbols ($\hat{n}$) may include a varying quantity of symbols. Also, the sequence ($\hat{u}$) of k conveyed bits may be of a varying quantity. To improve the encoding/compression procedure performed at the first arithmetic coding component 806 and the second arithmetic coding component 808, the first arithmetic coding component 806 and the second arithmetic coding component 808 may reset arithmetic coding parameters after performing the encoding procedure on the n symbols. In the above non-limiting example, for a first encoding procedure, the first arithmetic coding component 806 and the second arithmetic coding component 808 may reset the arithmetic coding parameters after processing the 25 symbols, and for a second coding procedure, the first arithmetic coding component 806 and the second arithmetic coding component 808 may reset the arithmetic coding parameters after processing the 5 symbols.

In some cases, the variable-to-fixed distribution matcher may reduce overhead in comparison to the fixed-to-fixed distribution matcher, as there is no need for transmission of bits that are discarded and the transmission of a discard signal can be skipped. Accordingly, the variable-to-fixed distribution matcher may improve spectral efficiency and reduce rate loss due to shaping.

However, there are also several problems associated with the distribution matcher encoding/decoding discussed above. For example, a number of output bits (encoded bits) per distribution matching (DM) block is different. This is because a prefix length for different intervals is different. Also, encoding of bits has to wait until completion of a previous encoding of bits. Accordingly, the parallel encoding of bits is not feasible (although a wireless receiver has no such issue as it can just concatenate decoded bits).

Example Parallel QDM Encoding

Aspects of the present disclosure provide apparatus, methods, processing systems, and computer readable mediums for performing parallel distribution matching (DM) encoding.

Figure 9:
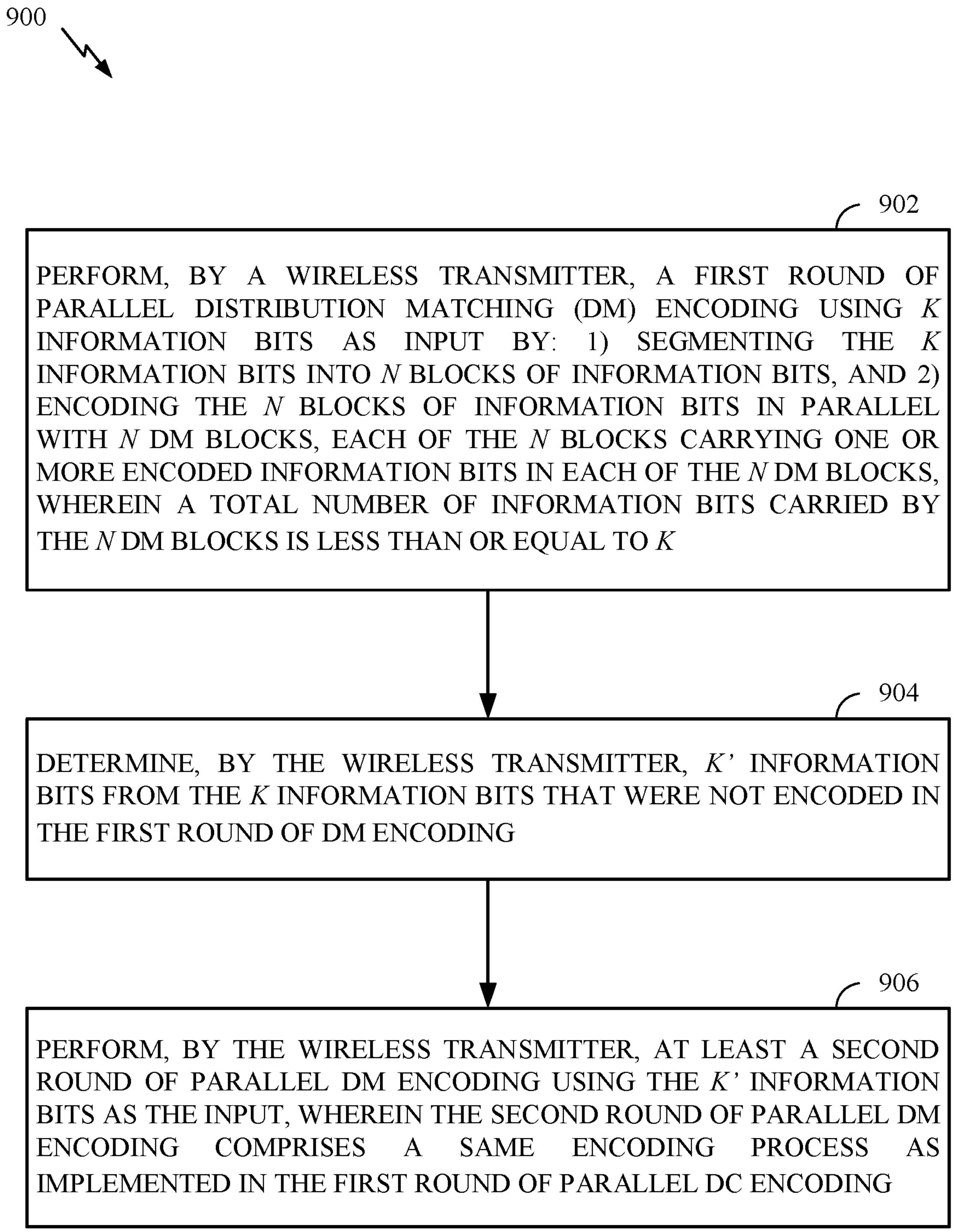
FIG. 9 is a flow diagram illustrating example operations for wireless communication by a wireless transmitter, in accordance with certain aspects of the present disclosure.

FIG. 9 is a flow diagram illustrating example operations 900 for wireless communication, in accordance with certain aspects of the present disclosure. The operations 900 may be performed, for example, by a wireless transmitter (e.g., such as the UE 120*a* and/or the BS 110*a* in the wireless communication network 100). The operations 900 may be implemented as software components that are executed and run on one or more processors (e.g., controller/processor 280 and/or controller/processor 240 of FIG. 2). Further, the transmission and reception of signals by the wireless transmitter in operations 900 may be enabled, for example, by one or more antennas (e.g., antennas 252 and/or antennas 234 of FIG. 2). In certain aspects, the transmission and/or reception of signals by the wireless transmitter may be implemented via a bus interface of one or more processors (e.g., controller/processor 280 and/or controller/processor 240) obtaining and/or outputting signals.

The operations 900 may begin, at block 902, by performing a first round of parallel DM encoding using k information bits as input by: 1) segmenting the k information bits into N blocks of information bits, and 2) encoding the N blocks of information bits in parallel with N DM blocks. Each of the N blocks carries one or more encoded information bits in each of the NDM blocks, and a total number of information bits carried by the N DM blocks is less than or equal to k. For example, the wireless transmitter may perform the first round of parallel DM encoding using a processor and/or an encoder of the UE 120*a* and/or the BS 110*a* shown in FIG. 1 or FIG. 2 and/or of the apparatus shown in FIG. 12.

At 904, the wireless transmitter determines k' information bits from the k information bits that were not encoded in the first round of DM encoding. For example, the wireless transmitter may determine the k' information bits from the k information bits using the processor of the UE 120*a* and/or the BS 110*a* shown in FIG. 1 or FIG. 2 and/or of the apparatus shown in FIG. 12.

At 906, the wireless transmitter performs at least a second round of parallel DM encoding using the k' information bits as the input. The second round of parallel DM encoding includes a same encoding process as implemented in the first round of parallel DC encoding. For example, the wireless transmitter may perform the second round of parallel DM encoding using the processor and/or the encoder of the UE 120*a* and/or the BS 110*a* shown in FIG. 1 or FIG. 2 and/or of the apparatus shown in FIG. 12.

Figure 10:
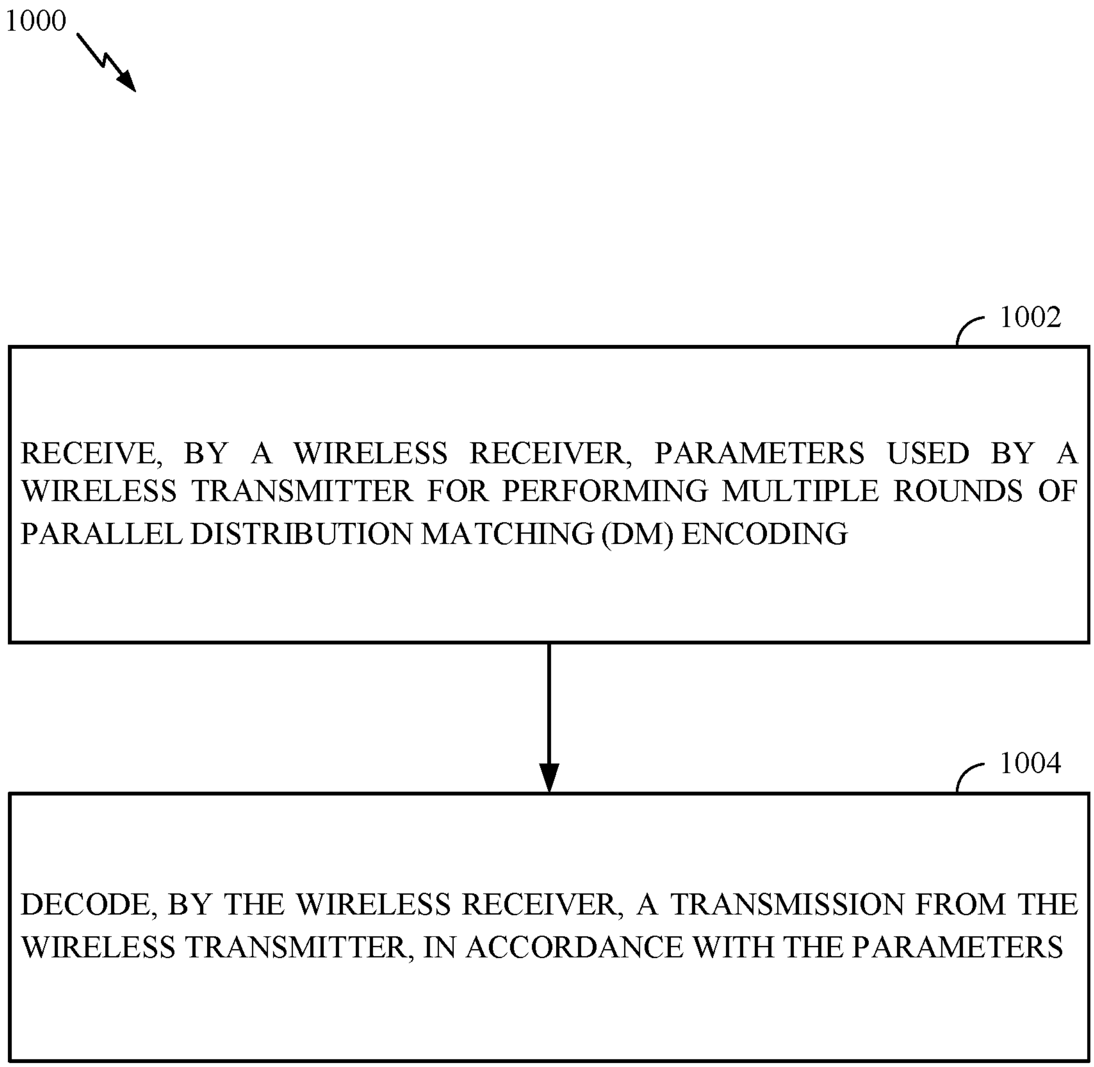
FIG. 10 is a flow diagram illustrating example operations for wireless communication by a wireless receiver, in accordance with certain aspects of the present disclosure.

FIG. 10 is a flow diagram illustrating example operations 1000 for wireless communication, in accordance with certain aspects of the present disclosure. The operations 1000 may be performed, for example, by a wireless receiver (e.g., such as the BS 110*a* and/or the UE 120*a* in the wireless communication network 100). The operations 1000 may be implemented as software components that are executed and run on one or more processors (e.g., controller/processor 240 and/or controller/processor 280 of FIG. 2). Further, the transmission and reception of signals by the wireless receiver in operations 1000 may be enabled, for example, by one or more antennas (e.g., antennas 234 and/or antennas 252 of FIG. 2). In certain aspects, the transmission and/or reception of signals by the wireless receiver may be implemented via a bus interface of one or more processors (e.g., controller/processor 240) obtaining and/or outputting signals.

The operations 1000 may begin, at block 1002, by receiving parameters used by a wireless transmitter for performing multiple rounds of parallel DM encoding. For example, the wireless receiver may receive the parameters using antenna(s) and receiver/transceiver components of the UE 120*a* and/or the BS 110*a* shown in FIG. 1 or FIG. 2 and/or of the apparatus shown in FIG. 13.

At 1004, the wireless receiver decodes a transmission from the wireless transmitter, in accordance with the parameters. For example, the wireless receiver may decode the transmission from the wireless transmitter using a processor and/or a decoder of the UE 120*a* and/or the BS 110*a* shown in FIG. 1 or FIG. 2 and/or of the apparatus shown in FIG. 13.

Figure 11:
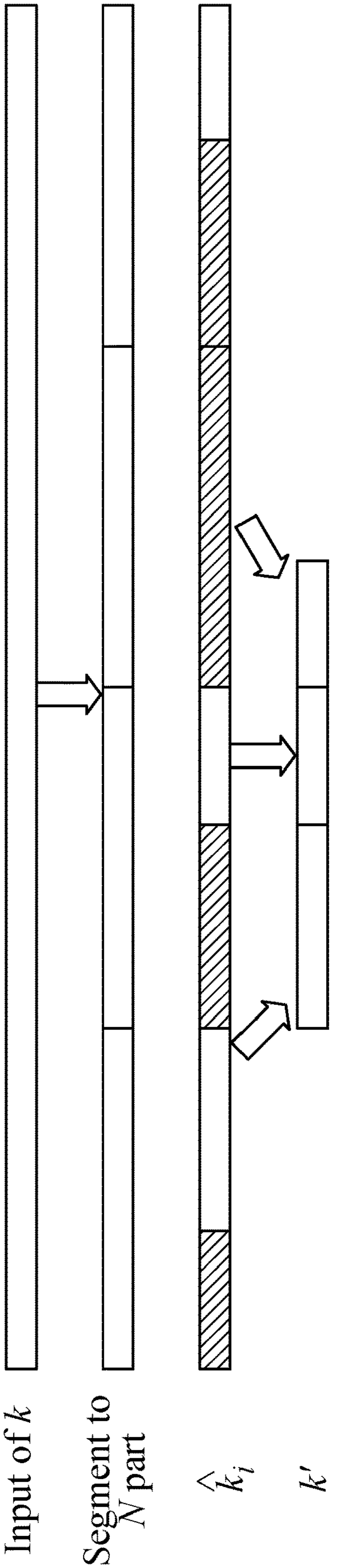
FIG. 11 illustrates example parallel distribution matching (DM) encoding using k information bits as an input, in accordance with certain aspects of the present disclosure.

The operations shown in FIGS. 9 and 10 may be understood with reference to the call flow diagram of FIG. 11.

As illustrated in FIG. 11, a wireless transmitter initially receives an input of k information bits from an information source that generates the k information bits.

In certain aspects, the wireless transmitter segments the k information bits into N blocks of information bits. Each of the N blocks have a same number of information bits from the k information bits (e.g., $\hat{k}_{max}$=k/N). For example, if there are 100 information bits and 5 blocks, then each block has 20 information bits.

In certain aspects, the wireless transmitter encodes the N blocks of information bits in parallel with N DM blocks. Each of the N blocks carries one or more encoded information bits in each of the N DM blocks. Each of the N DM blocks have a same number of encoded symbol length. In certain aspects, a total number of encoded information bits carried by the NDM blocks is less than or equal to k.

In certain aspects, the one or more encoded information bits carried by each of the N DM blocks are either less than or equal to each of the N blocks of information bits (e.g., $\hat{k}_i \leq \hat{k}_{max}$). This is because the wireless transmitter is configured to ensure that the one or more encoded information bits carried by each of the N DM blocks are either less than or equal to information bits in each of the N blocks.

In certain aspects, when the one or more encoded information bits carried by each of the N DM blocks are more than or equal to the information bits in each of the N blocks (e.g., $\hat{k}_i \geq \hat{k}_{max}$), the wireless transmitter determines a sequence of the k information bits that supports the one or more encoded information bits carried by each of the N DM blocks being less than or equal to each of the N blocks of information bits. For example, when $\hat{k}_i = \hat{k}_{max}$, the transmit sequence may have a length n̂'<n̂, and the wireless transmitter may then fill-up remaining n̂−n̂' symbols by targeting to output an interval that covers a corresponding $$\text{tag} \sum_{i=0}^{\hat{k}_{max}-1} 2^{-i} \times \vec{k}(i).$$

This may enable a minor change to the overall sequence distribution of the k information bits.

In certain aspects, the wireless transmitter determines k' information bits from the k information bits that were not encoded in the first round of DM encoding (e.g., k'=k−Σ$\hat{k}_i$). In certain aspects, the wireless transmitter performs a next round of parallel DM segmentation and encoding using the k' information bits as the input. The wireless transmitter will perform additional rounds of parallel DM segmentation and encoding until all of the k information bits are encoded.

In certain aspects, the wireless transmitter transmits an indication of parameters such as a number of the N DM blocks to a wireless receiver. The wireless transmitter transmits the indication of the number of the N DM blocks to the wireless receiver depending on a capability of the wireless transmitter. The capability of the wireless transmitter is based on a number of resources available for each of the N DM blocks. The number of the N DM blocks is related to a maximum size ($k_{max}$) of each of the N DM blocks (e.g. N=k/$k_{max}$). The maximum size of each of the N DM blocks is associated with a DM configuration. In one non-limiting example, the DM configuration may be associated with a target probability mass function (PMF). In another non-limiting example, the DM configuration may be associated with a target symbol length (e.g., an output symbol sequence length). In certain aspects, the wireless transmitter transmits signaling indicating the maximum size of each of the N DM blocks to the wireless receiver. In certain aspects, the wireless receiver decodes a transmission from the wireless transmitter in accordance with the parameters.

Example Wireless Communication Devices

Figure 12:
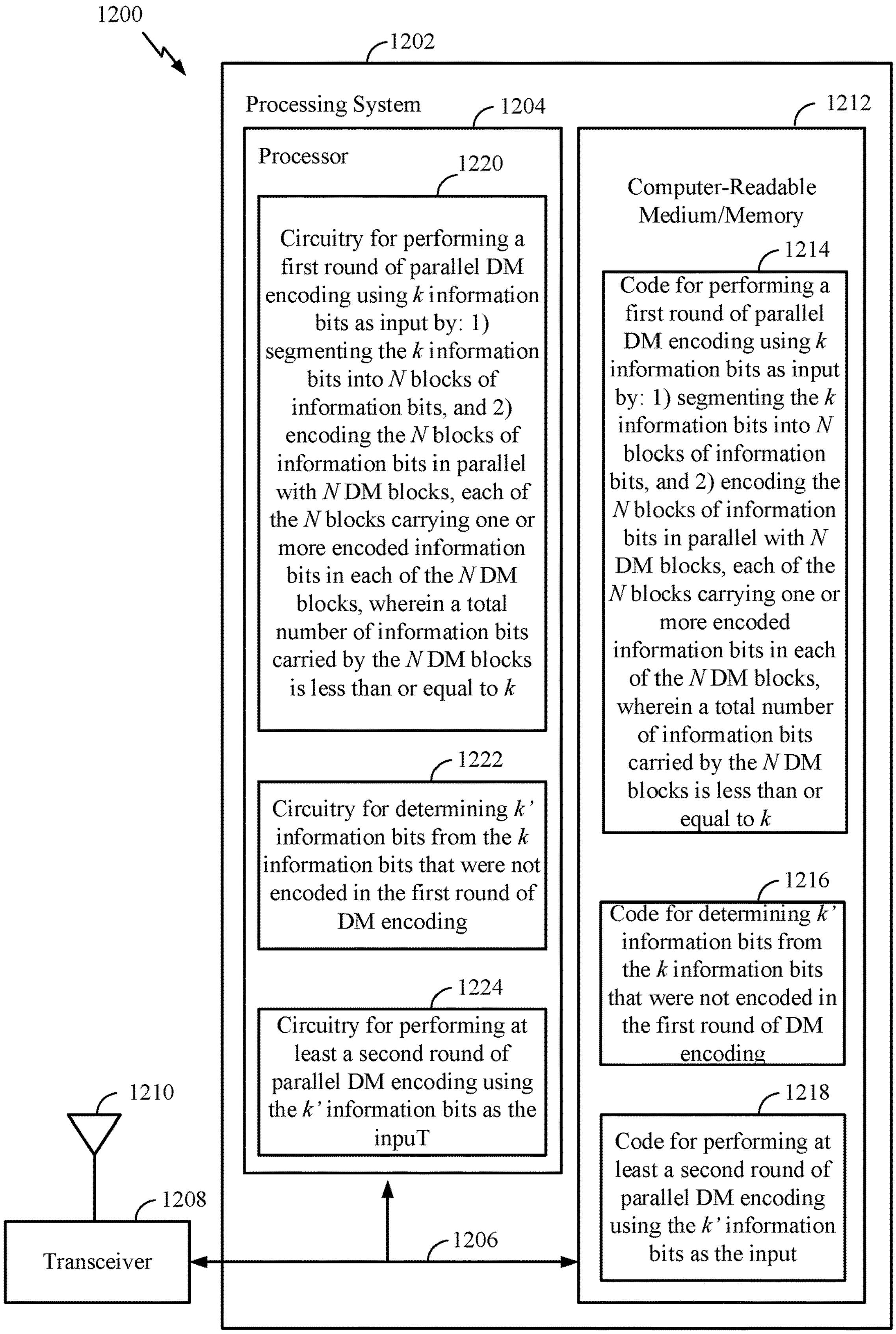
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 is configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., a computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for performing, code 1216 for determining, and code 1218 for performing. The code 1214 for performing may include code for performing a first round of parallel distribution matching (DM) encoding using k information bits as input by: 1) segmenting the k information bits into N blocks of information bits, and 2) encoding the N blocks of information bits in parallel with NDM blocks. Each of the N blocks carries one or more encoded information bits in each of the NDM blocks and a total number of information bits carried by the NDM blocks is less than or equal to k. The code 1216 for determining may include code for determining k' information bits from the k information bits that were not encoded in the first round of DM encoding. The code 1218 for performing may include code for performing at least a second round of parallel DM encoding using the k' information bits as the input. The second round of parallel DM encoding includes a same encoding process as implemented in the first round of parallel DC encoding.

The processor 1204 may include circuitry configured to implement the code stored in the computer-readable medium/memory 1212, such as for performing the operations illustrated in FIG. 9, as well as other operations for performing the various techniques discussed herein. For example, the processor 1204 includes circuitry 1220 for performing, circuitry 1222 for determining, and circuitry 1224 for performing. The circuitry 1220 for performing may include circuitry for performing a first round of parallel DM encoding using k information bits as input by: 1) segmenting the k information bits into N blocks of information bits, and 2) encoding the N blocks of information bits in parallel with N DM blocks. Each of the N blocks carries one or more encoded information bits in each of the NDM blocks, and a total number of information bits carried by the N DM blocks is less than or equal to k. The circuitry 1222 for determining may include circuitry for determining k' information bits from the k information bits that were not encoded in the first round of DM encoding. The circuitry 1224 for performing may include circuitry for performing at least a second round of parallel DM encoding using the k' information bits as the input. The second round of parallel DM encoding includes a same encoding process as implemented in the first round of parallel DC encoding.

Figure 13:
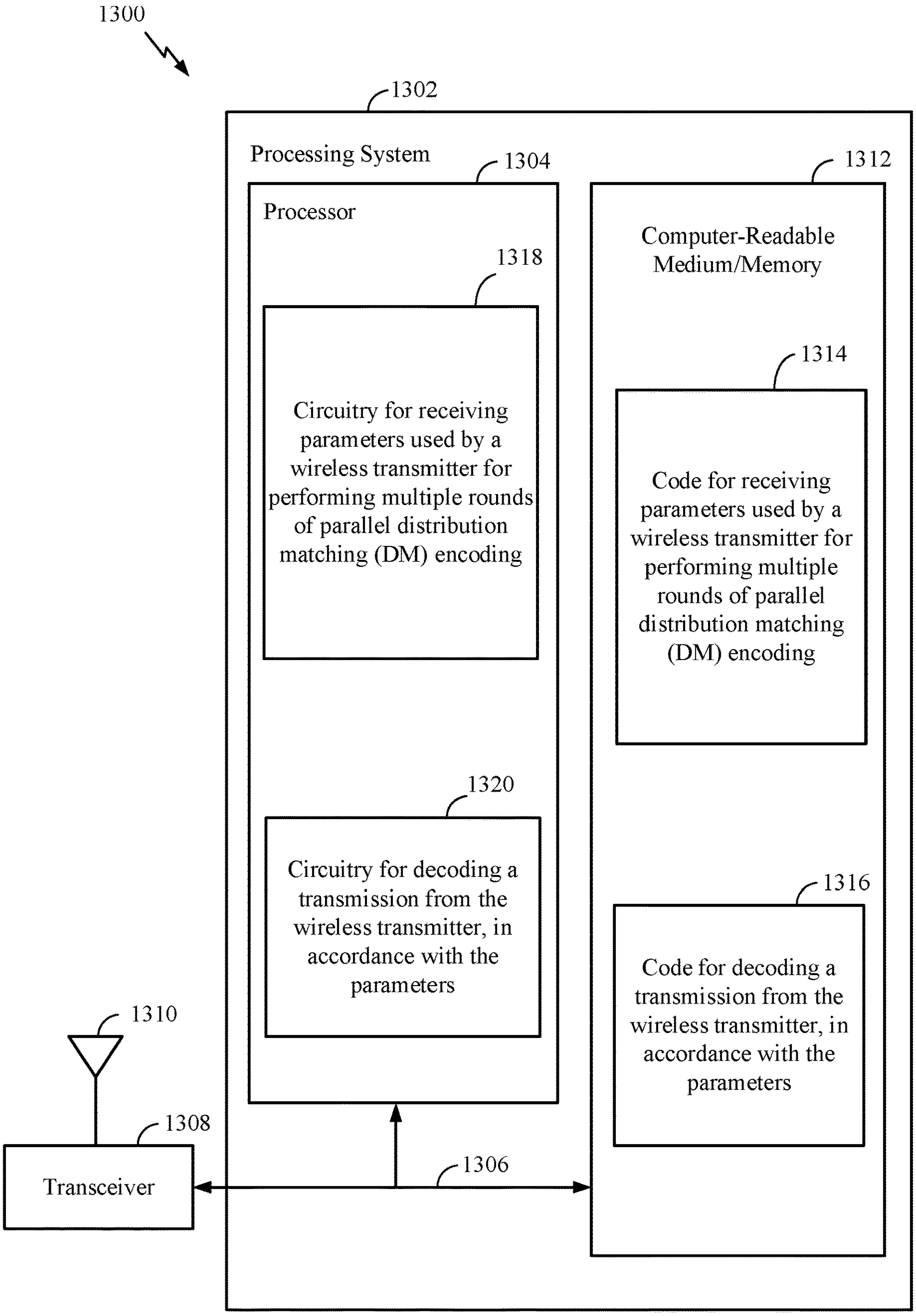
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 is configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., a computer-executable code) that when executed by the processor 1304, cause the processor 1304 to perform the operations illustrated in FIG. 10, or other operations for performing the various techniques discussed herein. In certain aspects, computer-readable medium/memory 1312 stores code 1314 for receiving and code 1316 for decoding. The code 1314 for receiving may include code for receiving parameters used by a wireless transmitter for performing multiple rounds of parallel DM encoding. The code 1316 for decoding may include code for decoding a transmission from the wireless transmitter, in accordance with the parameters.

The processor 1304 may include circuitry configured to implement the code stored in the computer-readable medium/memory 1312, such as for performing the operations illustrated in FIG. 10, as well as other operations for performing the various techniques discussed herein. For example, the processor 1304 includes circuitry 1318 for receiving and circuitry 1320 for decoding. The circuitry 1318 for receiving may include circuitry for receiving parameters used by a wireless transmitter for performing multiple rounds of parallel DM encoding. The circuitry 1320 for decoding may include circuitry for decoding a transmission from the wireless transmitter, in accordance with the parameters.

Example Aspects

Implementation examples are described in the following numbered aspects.

In a first aspect, a method for wireless communications by a wireless transmitter, comprising: performing a first round of parallel distribution matching (DM) encoding using k information bits as input by: 1) segmenting the k information bits into N blocks of information bits, and 2) encoding the N blocks of information bits in parallel with N DM blocks, each of the N blocks carrying one or more encoded information bits in each of the N DM blocks, wherein a total number of information bits carried by the N DM blocks is less than or equal to k; determining k' information bits from the k information bits that were not encoded in the first round of DM encoding; and performing at least a second round of parallel DM encoding using the k' information bits as the input, wherein the second round of parallel DM encoding comprises a same encoding process as implemented in the first round of parallel DC encoding.

In a second aspect, alone or in combination with the first aspect, performing additional rounds of parallel DM encoding until all of the k information bits are encoded.

In a third aspect, alone or in combination with one or more of the first and second aspects, each of the N DM blocks have a same number of information bits from the k information bits and a same number of encoded symbol length.

In a fourth aspect, alone or in combination with one or more of the first through third aspects, the one or more encoded information bits carried by each of the N DM blocks are less than or equal to each of the N blocks of information bits, based on a configuration of the wireless transmitter.

In a fifth aspect, alone or in combination with one or more of the first through fourth aspects, when the one or more encoded information bits carried by each of the N DM blocks are more than or equal to each of the N blocks of information bits, determining a sequence of the k information bits that supports the one or more encoded information bits carried by each of the N DM blocks being less than or equal to each of the N blocks of information bits.

In a sixth aspect, alone or in combination with one or more of the first through fifth aspects, transmitting an indication of a number of the N DM blocks to a wireless receiver.

In a seventh aspect, alone or in combination with one or more of the first through sixth aspects, the wireless transmitter transmits the indication to the wireless receiver depending on a capability of the wireless transmitter.

In an eighth aspect, alone or in combination with one or more of the first through seventh aspects, the capability of the wireless transmitter is based on a number of resources available for each of the NDM blocks.

In a ninth aspect, alone or in combination with one or more of the first through eighth aspects, the number of the N DM blocks is related to a maximum size of each of the NDM blocks.

In a tenth aspect, alone or in combination with one or more of the first through ninth aspects, the maximum size of each of the NDM blocks is associated with a DM configuration.

In an eleventh aspect, alone or in combination with one or more of the first through tenth aspects, the DM configuration is associated with a target probability mass function (PMF) and a target symbol length.

In a twelfth aspect, alone or in combination with one or more of the first through eleventh aspects, transmitting signaling indicating the maximum size of each of the NDM blocks to a wireless receiver.

In a thirteenth aspect, a method for wireless communications by a wireless receiver, comprising: receiving parameters used by a wireless transmitter for performing multiple rounds of parallel distribution matching (DM) encoding; and decoding a transmission from the wireless transmitter, in accordance with the parameters.

In a fourteenth aspect, alone or in combination with the thirteenth aspect, the parameters comprises a number of N distribution matching (DM) blocks.

In a fifteenth aspect, alone or in combination with one or more of the thirteenth and fourteenth aspects, the number of the N DM blocks is related to a maximum size of each of the NDM blocks.

In a sixteenth aspect, alone or in combination with one or more of the thirteenth to fifteenth aspects, the maximum size of each of the N DM blocks is associated with a DM configuration.

In a seventeenth aspect, alone or in combination with one or more of the thirteenth to sixteenth aspects, the DM configuration is associated with a target probability mass function (PMF) and a target symbol length.

In an eighteenth aspect, alone or in combination with one or more of the thirteenth to seventeenth aspects, receiving signaling indicating the maximum size of each of the NDM blocks from the wireless transmitter.

An apparatus for wireless communication, comprising at least one processor; and a memory coupled to the at least one processor, the memory comprising code executable by the at least one processor to cause the apparatus to perform the method of any of the first through eighteenth aspects.

An apparatus comprising means for performing the method of any of the first through eighteenth aspects.

A computer readable medium storing computer executable code thereon for wireless communications that, when executed by at least one processor, cause an apparatus to perform the method of any of the first through eighteenth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAN/I, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communications by a wireless transmitter, comprising:

performing a first round of parallel distribution matching (DM) encoding using k information bits as input by: 1) segmenting the k information bits into N blocks of information bits, and 2) encoding the N blocks of information bits in parallel with N DM blocks, each of the N blocks carrying one or more encoded information bits in each of the N DM blocks, wherein a total number of information bits carried by the N DM blocks is less than or equal to k;

determining k' information bits from the k information bits that were not encoded in the first round of DM encoding; and performing at least a second round of parallel DM encoding using the k' information bits as the input, wherein the second round of parallel DM encoding comprises a same encoding process as implemented in the first round of parallel DM encoding.

2. The method of claim 1, further comprising performing additional rounds of parallel DM encoding until all of the k information bits are encoded.

3. The method of claim 1, wherein each of the N DM blocks have a same number of information bits from the k information bits and a same number of encoded symbol length.

4. The method of claim 1, wherein the one or more encoded information bits carried by each of the N DM blocks are less than or equal to each of the N blocks of information bits, based on a configuration of the wireless transmitter.

5. The method of claim 1, further comprising:

when the one or more encoded information bits carried by each of the N DM blocks are more than or equal to each of the N blocks of information bits, determining a sequence of the k information bits that supports the one or more encoded information bits carried by each of the N DM blocks being less than or equal to each of the N blocks of information bits.

6. The method of claim 1, further comprising transmitting an indication of a number of the N DM blocks to a wireless receiver.

7. The method of claim 6, wherein the wireless transmitter transmits the indication to the wireless receiver depending on a capability of the wireless transmitter.

8. The method of claim 7, wherein the capability of the wireless transmitter is based on a number of resources available for each of the N DM blocks.

9. The method of claim 1, wherein the number of the N DM blocks is related to a maximum size of each of the N DM blocks.

10. The method of claim 9, wherein the maximum size of each of the N DM blocks is associated with a DM configuration.

11. The method of claim 10, wherein the DM configuration is associated with a target probability mass function (PMF) and a target symbol length.

12. The method of claim 9, further comprising transmitting signaling indicating the maximum size of each of the N DM blocks to a wireless receiver.

13. A method for wireless communications by a wireless receiver, comprising:

receiving parameters used by a wireless transmitter for performing multiple rounds of parallel distribution matching (DM) encoding; and decoding a transmission from the wireless transmitter, in accordance with the parameters.

14. The method of claim 13, wherein the parameters comprises a number of N distribution matching (DM) blocks.

15. The method of claim 14, wherein the number of the N DM blocks is related to a maximum size of each of the N DM blocks.

16. The method of claim 15, wherein the maximum size of each of the N DM blocks is associated with a DM configuration.

17. The method of claim 16, wherein the DM configuration is associated with a target probability mass function (PMF) and a target symbol length.

18. The method of claim 15, further comprising receiving signaling indicating the maximum size of each of the N DM blocks from the wireless transmitter.

19. An apparatus for wireless communications at by a wireless transmitter, comprising:

one or more memories comprising instructions; and one or more processors configured, individually or in any combination, to execute the instructions to cause the apparatus to:

perform a first round of parallel distribution matching (DM) encoding using k information bits as input by: 1) segmenting the k information bits into N blocks of information bits, and 2) encoding the N blocks of information bits in parallel with N DM blocks, each of the N blocks carrying one or more encoded information bits in each of the N DM blocks, wherein a total number of information bits carried by the N DM blocks is less than or equal to k;

determine k' information bits from the k information bits that were not encoded in the first round of DM encoding; and perform at least a second round of parallel DM encoding using the k' information bits as the input, wherein the second round of parallel DM encoding comprises a same encoding process as implemented in the first round of parallel DM encoding.

20. The apparatus of claim 19, wherein the one or more processors are configured, individually or in any combination, to execute the instructions to cause the apparatus to perform additional rounds of parallel DM encoding until all of the k information bits are encoded.

21. The apparatus of claim 19, wherein each of the N DM blocks have a same number of information bits from the k information bits and a same number of encoded symbol length.

22. The apparatus of claim 19, wherein the one or more encoded information bits carried by each of the N DM blocks are less than or equal to each of the N blocks of information bits, based on a configuration of the wireless transmitter.

23. The apparatus of claim 19, wherein the one or more processors are configured, individually or in any combination, to execute the instructions to cause the apparatus to determine a sequence of the k information bits that supports the one or more encoded information bits carried by each of the N DM blocks being less than or equal to each of the N blocks of information bits, when the one or more encoded information bits carried by each of the N DM blocks are more than or equal to each of the N blocks of information bits.

24. The apparatus of claim 19, wherein the one or more processors are configured, individually or in any combination, to execute the instructions to cause the apparatus to transmit an indication of a number of the N DM blocks to a wireless receiver depending on a capability of the wireless transmitter, and wherein the capability of the wireless transmitter is based on a number of resources available for each of the N DM blocks.

25. The apparatus of claim 19, wherein the number of the N DM blocks is related to a maximum size of each of the N DM blocks, wherein the maximum size of each of the N DM blocks is associated with a DM configuration, and wherein the DM configuration is associated with a target probability mass function (PMF) and a target symbol length.

26. An apparatus for wireless communications at a wireless receiver, comprising:

one or more memories comprising instructions; and one or more processors configured, individually or in any combination, to execute the instructions to cause the apparatus to:

receive parameters used by a wireless transmitter for performing multiple rounds of parallel distribution matching (DM) encoding; and decode a transmission from the wireless transmitter, in accordance with the parameters.

27. The apparatus of claim 26, wherein the parameters comprises a number of N distribution matching (DM) blocks.

28. The apparatus of claim 27, wherein the number of the N DM blocks is related to a maximum size of each of the N DM blocks.

29. The apparatus of claim 28, wherein the maximum size of each of the N DM blocks is associated with a DM configuration, and wherein the DM configuration is associated with a target probability mass function (PMF) and a target symbol length.

30. The apparatus of claim 28, wherein the one or more processors are configured, individually or in any combination, to execute the instructions to cause the apparatus to receive signaling indicating the maximum size of each of the N DM blocks from the wireless transmitter.

* * * * *